S. D. LUCAS.
Walking Planter.

No. 109,916.

Patented Dec. 6, 1870.

United States Patent Office.

SAMUEL D. LUCAS, OF WINTERPOCK, VIRGINIA.

Letters Patent No. 109,916, dated December 6, 1870.

IMPROVEMENT IN COMBINED HAND SEED-DRILLS AND CULTIVATORS.

The Schedule referred to in these Letters Patent and making part of the same.

To all whom it may concern:

Be it known that I, SAMUEL D. LUCAS, of Winterpock, in the county of Chesterfield and State of Virginia, have invented a new and useful Improvement in Combined Hand Seed-Drill and Cultivator; and I do hereby declare that the following is a full, clear, and exact description thereof, which will enable others skilled in the art to make and use the same, reference being had to the accompanying drawing forming part of this specification, in which—

Similar letters of reference indicate corresponding parts.

The object of my invention is to improve upon the seed-planters now known to the public.

I will first describe the invention in connection with all that is necessary to a full understanding thereof, and then clearly point it out in the claim.

A is the frame of the machine, consisting of two side bars connected at their forward ends by a cross-bar.

B is the seed-hopper, to the lower part of the sides of which are attached the lower ends of the iron straps C, the upper ends of which are bent outward, and are attached to the side bars of the frame A.

In the bottom of the hopper B is formed a hole or opening for the passage of the spout D that conducts the seed to the ground.

To the upper end of the spout or tube D is attached a hopper-shaped dish or pan, E, which fits into the lower part of the hopper B and rests upon the bottom of said hopper.

F is a cylindrical box, placed within the hopper B to receive the seed.

In the bottom of the box F is formed a number of holes or openings through which the seed escapes.

The lower end of the box F is covered with a cap, G, in which is formed a number of holes of the same number, shape, and size, and in the same relative position, so that, by adjusting the position of the cap G, the size of the discharge-openings may be adjusted according to the size of the seed and the amount to be dropped.

The cap G is secured to the box F by a bayonet-catch to hold it securely in place, and at the same time allow it to be conveniently adjusted.

The upper end of the box F is closed with a cover.

To the opposite sides of the upper part of the box F are attached two arms, H, which pass out through slots in the sides of the hopper B, and to the outer ends of which are pivoted the upper ends of the connecting-bars I.

To the lower ends of the bars I are pivoted the forward ends of the levers J, which are pivoted to the side bars of the frame A, and the rear ends of which extend back into such positions as to be struck and operated by the pins K attached to the ends of the roller L, the journals of which revolve in bearings attached to the lower sides of the rear ends of the side bars of the frame A.

By this construction, as the machine is drawn forward the revolution of the roller L causes the pins K to successively strike the rear ends of the levers J and raise the seed-box F.

As the ends of the levers J escape from the pins K the box F drops, and the jar causes an amount of seed, depending upon the size of the discharge-openings, to escape into the cup or pan E, from which it passes, through the spout D, to the ground.

The number of the pins K may be increased or diminished, according as the seed is to be dropped at a lesser or greater distance apart.

Figure 1:
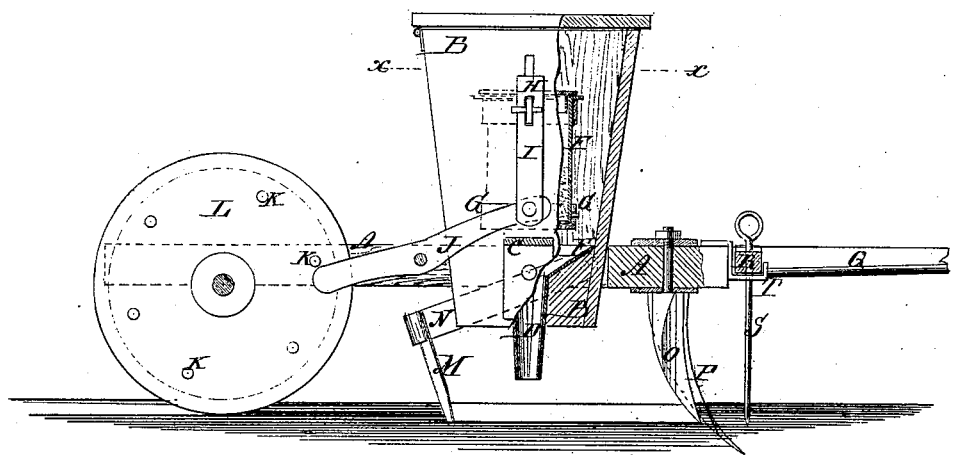
Figure 1 is a side view of my improved machine, parts being broken away to show the construction.
Figure 2:
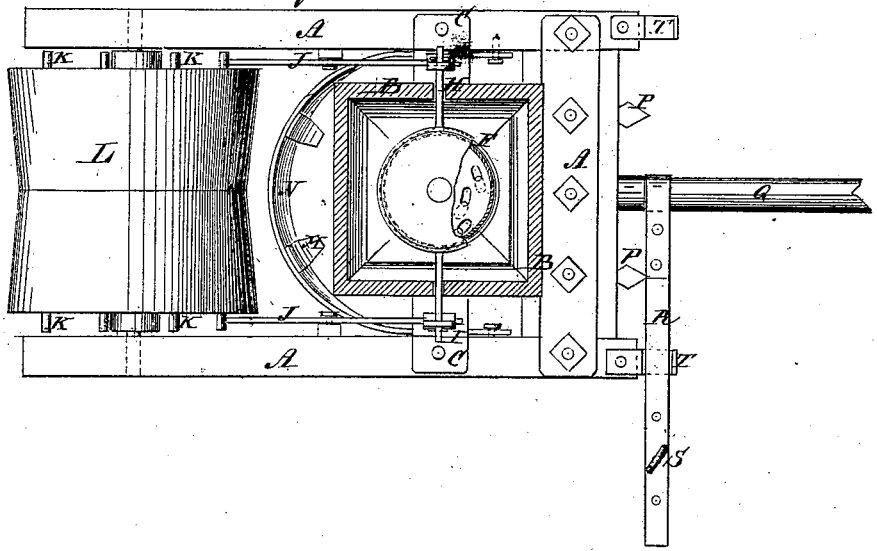
Figure 2 is a top view of the same, partly in section, through the line x x, fig. 1.

The face of the roller L I prefer to make concave, as shown in fig. 2, to leave the top of the ridge or row properly rounded off.

The seed is covered by the coverers M, which are attached to the curved bar N, the ends of which are pivoted to the side bars of the frame A.

The furrow is opened to receive the seed by the plow O, detachably attached to the middle part of the cross-bar of the frame A.

P are cultivator-teeth, which are attached to the cross-bar of the frame A upon each side of the plow O, and which may be used to loosen the soil when planting.

Q is the tongue or handle, by means of which the machine is drawn, and which is attached to the middle part of the cross-bar of the frame A.

To the lower part of the handle Q is pivoted a bar, R, by a band passing around the said handle and attached to the said bar, so that the bar R may be turned down into a horizontal position upon either side of the handle Q.

S is a rod passed down through a hole in the outer part of the bar R, to serve as a guide and gauge in planting, several holes being formed in the said bar to receive the said rod, so that it may be adjusted according as the rows are to be further apart or closer together.

T are rests or supports attached to the forward ends of the side bars of the frame A, to receive the bar R and support it in a horizontal position.

Having thus described my invention,

I claim as new and desire to secure by Letters Patent—

1. A bottom-perforated and shaking seed-box, F, combined with a pan-shaped receiver, E, placed thereunder to collect the scattered seed and converge them toward the discharge-tube D, as described.

2. The combination, with the dropping mechanism of a seed-planter, of the following instrumentalities, viz., the plow O to open the furrow, the pulverizers P to comminute the soil which is to be turned on the seed, the coverers M, and the concave ridge-roller L, when all are arranged as described.

SAMUEL D. LUCAS.

Witnesses:
S. R. OWENS,
R. P. GRYMES.